J. B. CASE.
LAMP AND LANTERN SNUFFER.
APPLICATION FILED DEC. 24, 1909.

968,740.

Patented Aug. 30, 1910.

Witnesses
C. Everett Lancaster
H. Jacob Doyle

Inventor
Joseph B. Case,
By E. E. Vrooman,
his Attorney,

THE NORRIS PETERS CO., WASHINGTON, D. C.

UNITED STATES PATENT OFFICE.

JOSEPH B. CASE, OF BUFFALO, NEW YORK.

LAMP AND LANTERN SNUFFER.

968,740.  Specification of Letters Patent.  Patented Aug. 30, 1910.

Application filed December 24, 1909. Serial No. 534,818.

*To all whom it may concern:*

Be it known that I, JOSEPH B. CASE, a citizen of the United States of America, residing at Buffalo, in the county of Erie and State of New York, have invented certain new and useful Improvements in Lamp and Lantern Snuffers, of which the following is a specification, reference being had therein to the accompanying drawing.

This invention relates to combined snuffers and wick trimmers and the principal object of the same is to provide an implement of the character stated that may be used for snuffing a lighted wick and at the same time trimming off the burned end of the wick to remove the carbon therefrom so that the end of the wick will be in proper condition for the next lighting.

In carrying out the object of the invention generally stated above it will be understood, of course, that the essential features thereof are necessarily susceptible of changes in details and structural arrangements, preferred and practical embodiments of which are shown in the accompanying drawings, wherein:—

Figure 1:
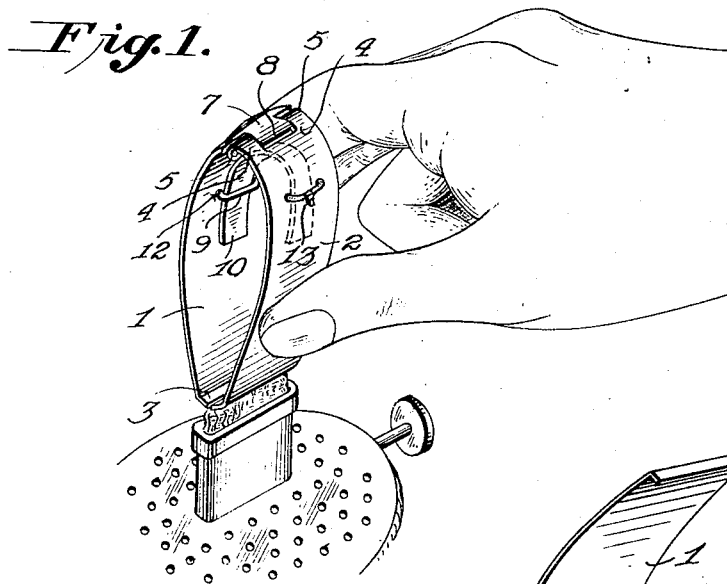
Figure 2:
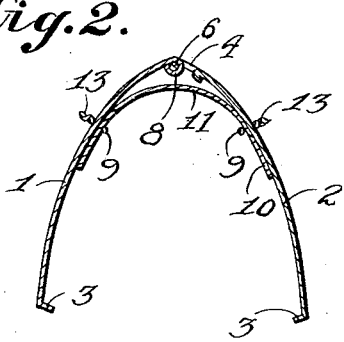
Figure 4:
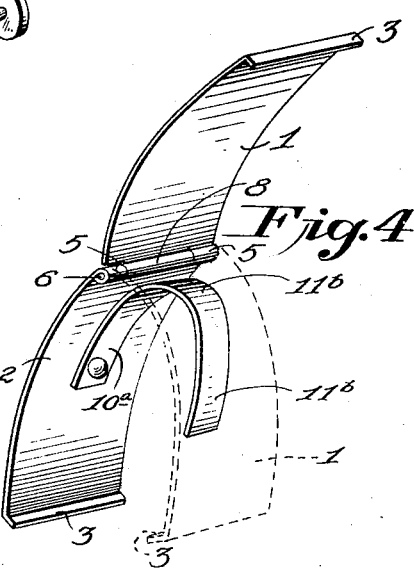
Figure 3:
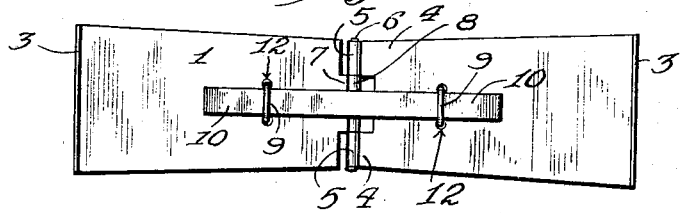

Figure 1 is a perspective view showing the practical application of the improved implement. Fig. 2 is a central vertical sectional view. Fig. 3 is a detail plan view, the implement being shown in a flattened spread out position. Fig. 4 is a perspective view of a modified form of the invention.

Referring to said drawings by numerals, it will be observed that the improved snuffing and wick trimming or cleaning implement is primarily composed of two sheet metal members 1—2 preferably of a substantial rectangular shape, each having its free end provided with a short inwardly projecting trimming flange 3 that extends the entire width of said free end. The member 2 at the end opposite the flange is bifurcated to provide a pair of spaced apart ears 4 having their free end rolled to provide bearings 5 for the pivot pin 6. The similar end of the member 1 has a centrally located outwardly projecting ear 7 whose free end is rolled to provide a bearing 8 that engages the pivot pin 6 between the end bearings 5 of the member 2, thereby holding said members 1 and 2 in hinged engagement.

The members 1 and 2 are slightly bowed outwardly, and each is provided with a guiding and holding loop 9 that projects from its inner surface, said guide loops being preferably centrally located adjacent the hinged end of the said members.

A leaf spring 10 has its end portions held in contact with the members 1—2 by the loops 9, said leaf spring having its bowed portion 11 conforming to the contour of the hinged portions of said members 1—2. The spring 10 is an expansible one and constantly exerts a pressure tending to force the members 1—2 in opposite directions. Preferably the spring is loose in the loops, but is retained in its member-spreading position by its resiliency. The loops 9 are preferably formed of wire the ends of which are passed through openings 12 in the members 1—2 and then twisted or otherwise fastened together.

As will be seen by reference to Fig. 1, the implement may be grasped by the thumb and forefinger of one hand and the members 1—2 rocked together against the tension of spring 10 to cause the trimming flanges 3 of said members to "bite" through the burning end of a wick, thereby snuffing the light and simultaneously cutting off the burned portion of the wick so that the wick will be left in a clean condition for the next lighting.

As will be obvious, the members 1—2 are of such a nature that they may be readily stamped or punched by a single operation of a suitable machine, thus materially cheapening the cost of production of the implement.

In Fig. 4, a modified spring has been shown for the members 1—2. Said spring, which is designated by the numeral $10^a$, has one end riveted or otherwise rigidly fastened to the member 2, and its body is bowed as indicated at $11^a$ to conform to the curvature of the inner surfaces of said members 1—2, and its free end $11^b$ bears against the member 1, and exerts a pressure tending to force the said members in opposite directions.

What I claim as my invention is:—

1. An implement of the character described comprising a pair of outwardly-bowed members hinged at one end and having at the other end of each member an inwardly-projecting trimming flange, a bowed spring mounted between the upper ends of said bowed members, said bowed members extending for a distance beyond said bowed spring and serving as means for closing said bowed members to operate the same.

2. An implement of the character described comprising a pair of members having a hinge connection at one end, a trimming flange at the free end of each member, a guiding and holding loop carried by each member, and a spring interposed between said members and having its ends fitted within said loops.

3. An implement of the character described comprising two outwardly bowed members having a hinge connection at one end, trimming means carried by the other ends of said members, and a spring interposed between the hinged ends of said members and having its ends loosely connected to the same.

In testimony whereof I hereunto affix my signature in presence of two witnesses.

JOSEPH B. CASE.

Witnesses:
W. MILTON KELLY,
WALTER A. FLEMING.